United States Patent
Arsenault et al.

(10) Patent No.: US 9,913,489 B1
(45) Date of Patent: Mar. 13, 2018

(54) PEANUT BUTTER SLICES

(71) Applicants: Peter Arsenault, Dracut, MA (US);
Kyle T Arsenault, Dracut, MA (US);
Matthew L Arsenault, Dracut, MA (US)

(72) Inventors: Peter Arsenault, Dracut, MA (US);
Kyle T Arsenault, Dracut, MA (US);
Matthew L Arsenault, Dracut, MA (US)

( * ) Notice: Subject to any disclaimer, the term of this patent is extended or adjusted under 35 U.S.C. 154(b) by 52 days.

(21) Appl. No.: 15/251,120

(22) Filed: Aug. 30, 2016

(51) Int. Cl.
*A23L 25/10* (2016.01)
*A23L 21/25* (2016.01)
*A23L 25/00* (2016.01)
*A23L 5/20* (2016.01)

(52) U.S. Cl.
CPC .............. *A23L 25/30* (2016.08); *A23L 5/20* (2016.08); *A23L 21/25* (2016.08); *A23L 25/10* (2016.08); *A23V 2002/00* (2013.01)

(58) Field of Classification Search
CPC . A23L 25/30; A23L 5/20; A23L 25/10; A23L 21/25; A23V 2002/00
USPC ........ 426/633, 634, 658, 108, 119, 489, 518
See application file for complete search history.

(56) References Cited

U.S. PATENT DOCUMENTS

| | | | | |
|---|---|---|---|---|
| 3,772,038 A | * | 11/1973 | Ayres et al. | |
| 5,312,641 A | * | 5/1994 | Castillo, Jr. | |
| 5,567,454 A | * | 10/1996 | Bogdan | |
| 5,855,939 A | * | 1/1999 | Bogdan | |
| RE37,275 E | * | 7/2001 | Bogdan | 426/93 |
| 6,716,471 B2 | * | 4/2004 | Kramer | 426/584 |
| 6,759,069 B2 | * | 7/2004 | Gray | 426/89 |
| 6,986,912 B2 | * | 1/2006 | Kramer | 426/584 |
| 7,060,311 B1 | * | 6/2006 | Milani et al. | 426/414 |
| 7,501,144 B1 | * | 3/2009 | Gray | 426/650 |
| 8,445,054 B2 | * | 5/2013 | Reddy et al. | 426/632 |
| 2002/0068122 A1 | * | 6/2002 | Hathi | 426/473 |
| 2016/0309758 A1 | * | 10/2016 | McGlynn et al. | 426/633 |

* cited by examiner

*Primary Examiner* — Helen F Heggestad

(57) ABSTRACT

Low fat peanut butter food slices that are all natural, made from dehydrated peanut powder, and having nothing added thereto but water, or water with honey and or salt dissolved therein. The peanut butter food slices have a viscosity in the range of 800,000 centipoise to 2,000,000 centipoise which is much thicker than regular peanut butter which has a viscosity in the range of 150,000 centipoise to 250,000 centipoise.

10 Claims, No Drawings

PEANUT BUTTER SLICES

FIELD OF THE INVENTION

The present invention relates to all natural, low fat peanut butter slices that are separated by inert packaging material and are easily separated to make a peanut butter sandwich, crackers or to eat alone.

BACKGROUND OF THE INVENTION

Peanut butter is generally dispensed from glass jars or other rigid containers. Removal of the peanut butter from these containers is usually inconvenient, generally requiring the use of a knife or other appropriate utensil. Most peanut butter is consumed with bread, usually in the preparation of sandwiches and the like.

For convenience in dispensing peanut butter for making sandwiches or placement on crackers for snacks, it has been found that peanut butter can be prepared in a multi-layer sliced form, and sometimes layered jelly, comprising a plurality of peanut butter slices wherein each peanut butter slice is sandwiched between layers of inert packaging material whereby the peanut butter slices can be individually separated without sticking to the packaging material or pulling apart. The present method of packaging peanut butter is particularly convenient for many home and institutional situations inasmuch as the sliced peanut butter can be conveniently and rapidly dispensed. Patented prior art examples are as follows.

U.S. Pat. No. 3,772,038 teaches a multi-layer sliced form of peanut butter suitable for refrigerator and freezer storage. To make these peanut butter slices conventional high fat peanut butter is utilized that has about 0.5 to 3.5 percent by weight of a hardening stabilizer, preferably a mixture of edible mono- and diglycerides, a hydrogenated vegetable oil, a hydrogenated animal oil, or mixtures thereof added thereto. After other processing the slices are created. The prepared slices are separated by a packaging material. There is no reduction in the fat content of the peanut butter slices.

U.S. Pat. No. 5,312,641 teaches the creation of slices of peanut butter that also utilizes conventional high fat peanut butter that has powdered egg white and an edible emulsifier mixed therewith. The mixture is then pressed or extruded into thin sheets that are cut and stacked, and the individual slices are separated from each other with waxed paper or the like. The prepared slices can then be separated and utilized in the same way that sliced cheese may be handled. There is no reduction in the fat content of the peanut butter slices.

U.S. Pat. No. 5,567,454 teaches nut butter and jelly food slices where a first a second layer of solidified jelly are sandwiched to form a hollow region there between in which is placed conventional high fat peanut butter. There may be a single layer of nut butter. There is no reduction in the fat content of the peanut butter used to make such slices.

U.S. Pat. No. 5,855,939 teaches nut butter and jelly slices where a layer of nut butter is encapsulated between two layers of jelly to which a gelling agent, food starch and vegetable oil has been added to solidify the jelly so it can retain its shape. Each such slice is packaged in the open recessed area of a flexible package having a top thereon.

U.S. Pat. No. 6,716,471 teaches a peanut powder composition that includes fructose, sugar and other ingredients, and wherein the peanut powder composition is used in making flavorful foods and beverages. Raw peanuts are roasted, blanched, and ground to a semi-fine peanut butter paste of 8 to 14 mils. The paste is then pressed to remove excess peanut oil from the peanut paste and create a cake which is then pulverized into the peanut powder to which the other materials are blended such as fructose, sugar, dextrose, cocoa powder and/or salt.

U.S. Pat. No. 6,759,069 teaches forming single serve slices of food condiments, including conventional high fat peanut butter that are stacked but are separated by paper separator sheets. The peanut butter used is conventional high fat peanut butter so there is no reduction in the fat content of the peanut butter slices.

U.S. Pat. No. 6,986,912 teaches making a peanut powder to which one or more other materials such as fructose, sugar, dextrose, cocoa powder, vanilla powder and/or salt may be blended. The mixture may be added to a liquid such a milk, carbonated water, and alcoholic beverages to make a beverage composition. The mixture may also be used to make ice cream. The peanut powder is made by first roasting peanuts, removing their skins with a blancher, then grinding the nuts to a semi-fine peanut butter paste of 8 to 14 mils. The peanut butter paste is then pressed to remove excess peanut oil and create a cake which is then pulverized into the peanut powder to which the other materials are added.

U.S. Pat. No. 7,060,311 teaches forming individual slices of a combination of conventional high fat peanut butter and jelly. The peanut butter has corn syrup added thereto to increase its water activity, and an emulsifier is also added to the peanut butter during mixing and prior to cooking to thicken the mixture. The peanut butter is a combination of roasted and ground peanuts and peanut flour having some of the oil removed. This, in conjunction with the emulsifier, creates a firmness required for extrusion into slices and separate packaging of the slices using high oxygen barrier films.

U.S. Pat. No. 7,501,144 teaches forming individual slices of food condiments, including conventional high fat peanut butter. Other layers, such a jelly, may be added. The peanut butter used is conventional high fat peanut butter. Individual slices are separated by hermetically sealed protective plastic, thermoplastic, or cellophane single-serve wrapping.

Reissue Patent RE37,275 teaches forming slices of nut butter and jelly made by encapsulating regular high fat nut butter between a first and a second layer of jelly.

U.S. Pat. No. 8,445,054 teaches a process for preparing reduced fat, high fiber, high protein, low calorie roasted snack nuts. 20% to 50% of the oil is expelled from nutmeat kernels using a pressing process. The pressing deforms the nuts but water heated to a temperature between 176° to 212° Farenheit is added and the nuts are reformed to their original shape. The reformed nuts are annealed using cold water ranging from 32° to 68° F. to produce hardened nuts. The nuts are then dried and post-processed with coatings and roasting using state-of-the-art technology. The yield of snack nuts produced by this process is generally greater than eighty percent.

U.S. Patent Appn. Pubn. 2002/0068122 teaches a fat free nut that is formed by shelling a quantity of nuts and milling them through rollers to crush the nuts into particles which extracts some of the oil. The nut particles are then crushed into a powder. The powder is combined with a binder to give a desired crunch, and other agents to enhance the color and flavor. The powder is then blended with a liquid binder to form a slurry that is inserted into molds having the shape of peanuts. The slurry is the allowed to dry and harden in the molds without compression, and the peanuts are removed when dried.

However, prior art peanut butter slices are not low fat peanut butter slices that are all natural, made only from peanut powder having very low fat content, having no emulsifiers or other thickening agents added to the peanut butter made from the peanut powder to achieve a viscosity that can be formed into and handled like slices, and the low fat peanut butter slices are easy to make and are more healthy for a consumer than peanut butter slices with additives added thereto.

SUMMARY OF THE INVENTION

The present invention relates to all natural, low fat peanut butter food, that is pre-packaged as peanut butter food slices which are generally sandwich sized, but may be other sizes. The novel peanut butter slices described herein are all natural in that they have no hardening stabilizer or other thickening agents added thereto such as edible mono- and diglycerides, a hydrogenated vegetable oil, a hydrogenated animal oil, or mixtures thereof.

The low fat peanut butter slices have a high enough viscosity that they are non-sticky and do not stick to an inert packaging material used to package the slices by having each peanut butter slice between two sheets of the inert packaging material, thus allowing the slices to be easily removed from their packaging material and placed directly onto a slice of bread. These low fat peanut butter slices retain an excellent, all natural peanut butter taste and texture. Refrigeration of the slices is preferred for longevity of product shelf life. One advantage is that at such cold or room temperatures low fat peanut butter slices can be easily and quickly applied to a slice of bread, or other type of support such as a cracker, and not damage the bread or cracker.

Raw peanuts are first roasted at temperatures not to exceed 300 degrees Fahrenheit for a period of approximately 15 minutes. Alternatively, the raw peanuts may be partially roasted. The roasting improves the peanut flavor of the peanut powder. The roasted peanuts are allowed to cool which may be done in different ways known in the art such as sitting at room temperature or by passing the roasted peanuts through a cooling system which brings the temperature of peanuts down to approximately 120 to 130 degrees Fahrenheit.

When cooled to the desired temperature, the fully roasted or partially roasted peanuts are discharged to a gravity separator or de-stoner, or similar apparatus, the operation of which allows further cooling time and also causes light materials associated with the roasted peanuts to be separated by vacuuming out, while the heavier peanuts move downward and are discharged. Any remaining peanut skins are removed by a blancher, which splits the roasted peanut in half, at which point the skins are aspirated out. The splitting also aids in removing the core or heart of the peanut. The blanched peanuts may be passed over a pick table where more extraneous material may be manually removed. The peanuts may also be passed through a safe line metal detector that removes any ferrous and non-ferrous metals.

The resultant shelled, fully or partially roasted peanuts are then passed through a mill and are pressed to extract much of the oil from the nuts. Any of a number of milling and pressing processes known in the art may be utilized. For example, a grinder mill grinds the fully or partially roasted peanuts to a semi-fine peanut butter paste having a particle size in the order of 10 mils. A temperature exceeding 165 degrees Fahrenheit may be applied to the nuts at the grinding mill to enhance the killing of any microorganisms in the paste and to drive off water.

A high-pressure press is then used to press in the order of 60% to 70% of the oil out of the peanut butter paste. Increased pressure is used to decrease the peanut oil and fat to a low level. The result is a dehydrated peanut cake that is passed through a crushing device, which pulverizes the cake into a free flowing dehydrated peanut powder. The powder may be passed through a screen to ensure the uniformity thereof before further use.

The resultant dehydrated peanut powder is used to make the all natural, low fat peanut butter food slices in accordance with the teaching of the invention. There are absolutely no preservatives, thickening agents such as hydrogenated vegetable oils, edible mono- and diglycerides, color or flavor enhancers, edible emulsifing agents, gelling agents, food starch, or any other artificial additives added to the peanut powder when making the slices. Some people have reactions to such additives. Other all natural additives, including honey and salt, may be added.

To make the low fat peanut butter slices warm water is mixed with the peanut powder as a binding agent until there is a firm consistency, thicker than regular peanut butter, that is not too sticky so that when the mixture is shaped into peanut butter slices and packaged between sheets of inert packaging material, each peanut butter slice can easily be individually peeled from the packaging material without any detrimental sticking thereto or pulling apart of the peanut butter slice.

More particularly, water is mixed with the dehydrated peanut powder until a preferable viscosity of in the range of 1,000,000-2,000,000 Centipoise (cP) is obtained. Centipoise (cP) is a standard unit of measurement for viscosity, or resistance to flow and water has a viscosity of 1 cP. To understand how thick this is, Crisco shortening or lard has a viscosity of 1,000,000 cP-2,000,000 cP but has much fat content. However, if so desired, the peanut powder and water mixture may have a higher viscosity to form even firmer peanut butter slices. Caulking compounds have a viscosity of 5,000,000 cP and higher. The chosen viscosity for the peanut butter slices may be somewhat lower than 1,000,000 cP but must be significantly higher than the viscosity of peanut butter available on the market which has a viscosity is in the order of 150,000 cP to 250,000 cP. The higher viscosity is required so the novel peanut butter slices will hold their shape and not stick to the inert packaging material between which the peanut butter slices are stored.

In an alternative embodiment of the invention natural honey may be dissolved in the warm water before it is mixed with the peanut powder. Any desired degree of sweetness is thereby added to the peanut butter slices while they retain their all natural status. In this event the amount of added water is less in order to stay within the higher viscosity required to form the novel peanut butter slices.

DETAILED DESCRIPTION

As described in the Summary of the Invention a low fat (low peanut oil content) peanut powder is utilized in making the novel, all natural low fat peanut butter food slices of the present invention. To make the low fat peanut butter food slices, only water having a temperature of between 120 degrees to 190 degrees is mixed with the peanut powder as a binding agent until there is a firm consistency having a viscosity in excess of 800,000 centipoise (cP) and up to 2,000,000 cP, which is thicker than regular peanut butter which has a normal viscosity in the range of 150,000 cP to 250,000 cP. The novel peanut butter mixture, is not too sticky so that when the mixture is shaped into peanut butter food slices and packaged between sheets of inert packaging material, each peanut butter food slice can be individually peeled from the packaging material without any substantial sticking thereto or pulling apart of the peanut butter food slice.

Raw peanuts are first roasted at temperatures not to exceed 300 degrees Fahrenheit for a period of approximately 15 minutes. As mentioned in the Summary of the Invention the partially roasted nuts are discharged to a gravity separator or de-stoner, or similar apparatus, the operation of which allows further cooling time and also causes light materials associated with the roasted peanuts to be separated by vacuuming out, while the heavier peanuts are discharged. This includes peanut hearts. Any remaining peanut skins are removed by a blancher, which splits the roasted peanut in half, at which point the skins are aspirated out. The splitting also aids in removing the bitter core of the peanut. The blanched peanuts may be passed over a pick table where more extraneous material may be manually removed. The peanuts may also be passed through a safe line metal detector that removes any ferrous and non-ferrous metals.

The roasted and processed peanuts are then pressed to extract much of the oil from the nuts. Any of a number of milling and pressing processes known in the art may be utilized. For example, a grinder mill grinds the fully or partially roasted peanuts to a semi-fine peanut butter paste having a particle size in the order of 10 mils.

A high-pressure press is then used to press in the order of 60% to 70% of the oil out of the peanut butter paste. Increased pressure may be used to decrease the peanut oil and fat to a lower level. The result is a peanut cake that is passed through a crushing device, which pulverizes the cake into a free flowing peanut powder. The powder may be passed through a screen to ensure the uniformity thereof before further use.

To make the low fat peanut butter food slices warm water is mixed with the peanut powder as a binding agent, as described in detail in paragraph [0031], until there is a firm consistency, thicker than regular peanut butter, that is not too sticky so that when the mixture is shaped into peanut butter food slices and packaged between sheets of inert packaging material, each peanut butter food slice can be individually peeled from the inert packaging material without any detrimental sticking thereto or pulling apart of the low fat peanut butter food slice.

Refrigeration of the peanut butter food slices is preferred for longevity of product shelf life. One advantage is that such cold or room temperature low fat peanut butter slices can be easily and quickly applied to a slice of bread, or other type of support such as a cracker, and not damage the bread or cracker.

There are absolutely no preservatives, hydrogenated vegetable oils, edible mono- and diglycerides, color or flavor enhancers, edible emulsifing agents, gelling agents, food starch, or any other additives added to the peanut powder and water mixture when making the slices. Some people have reactions to such additives. Other all natural additives, such as honey or salt, may be added. When honey is added the amount of water added is reduced to maintain the desired measured viscosity which is in the range of 800,000 centipoise to 2,000,000 centipoise.

The low fat peanut powder and water mixture, and sometimes with honey, is formed into a sheet by a process such as extrusion molding, thin film molding, injection molding, compression molding, or any other process or combination of processes which will accomplish the objective of forming food slices of peanut butter. The size of the peanut butter sheets being manufactured may vary depending on such factors as, among others, subsequent operating or process steps, capacity of machinery, and type of process used. The peanut butter sheets may have any desired thickness. As an example, the thickness of the novel peanut butter sheets, and the resulting individual peanut butter slices, can be determined by the average amount or average volume of the peanut butter generally placed in a sandwich or on cracker for consumption. The peanut butter sheets are subsequently divided by a cutting operation into sandwich-sized, cracker sized, single-serve, peanut butter food slices. The cutting operation uses a cutting tool which has heated cutting blades or non-heated cutting blades, which provides a smooth cut. The final product of the manufacturing process are sandwich-sized, single-serve, food slices of peanut butter, having a desired thickness, which are hermetically sealed in individual, inert wrapping. Each peanut butter food slice can be individually peeled from the mass without any substantial sticking thereto or pulling apart of the peanut butter. A plurality of the hermetically sealed, individually wrapped, sandwiched-sized, single-serve, peanut butter food slices can be further packaged in a labeled, protective plastic, thermoplastic, or cellophane wrapping for shipping, dispensing and sale.

In an alternative embodiment of the invention natural honey may be dissolved in the warm water before it is mixed with the peanut powder to create the peanut butter. It is preferred that raw honey is utilized. However, non-raw honey may also be utilized. Any desired degree of sweetness is thereby added to the peanut butter food slices while they retain their all natural status. The honey adds to the capability of the mixture, including water, to act as a binding agent with the peanut powder.

Alternative packaging for the sandwich-sized, single-serve, food slices of peanut butter involves providing a plurality of face-to-face stack of slices with each slice separated from other slices using paper or plastic separator sheets on the face surfaces of each of the peanut butter slices. These paper or plastic separated peanut butter food slices may then be further wrapped and packaged in a box or wrapped in cellophane or other desired materials, as an outer packaging material. The packages containing a plurality of peanut butter food slices can be sold in grocery stores, super markets, and convenience stores to the general public. Also, other establishments, such as delicatessens, convenience stores, sandwich shops, and restaurants may also use the peanut butter food slices of the invention to prepare sandwiches for sale. The form, shape, and consistency of the peanut butter slices of the invention allows sandwiches to be prepared at a time in advance of the sale because the individually sliced food condiments of the instant invention will not affect the texture of the bread used to make the sandwich when the sandwich is stored for an extended period of time.

In addition, the peanut butter food slices formed and used in the invention are not intended to melt or soften when exposed to heat. Thus, individuals using the peanut butter food slices of the invention do not have to contend with the dripping of the peanut butter slices from a sandwich during eating. An additional advantage of the peanut butter food slices of the invention includes elimination of the tedious burden of packing and carrying a bulky bottle or jar of peanut butter on outings, such as picnics and vacations.

While the present invention is depicted in a single embodiment and one alternative embodiment, it will be appreciated by those skilled in the art that many modifications and variations can be made without departing from the true spirit and scope of the invention. It is therefore the intent of the appended claims to cover all the modifications and variations that fall within the true spirit and scope of the invention.

The invention claimed is:

1. A low fat peanut butter food slice made from peanuts ground to create a peanut butter paste with oil that is then pressed to remove much of the peanut oil in the paste and the resultant peanut cake is pulverized to create a free flowing, low fat dehydrated peanut powder, the low fat peanut butter food slice consisting of only:

low fat peanut powder; and water mixed with the low fat peanut powder to create a low fat peanut butter mixture having a viscosity greater than 800,000 centipoise and the mixture is thick enough to form the low fat peanut butter food slices;

wherein, no hardening agents or any other materials are added to the water and low fat peanut butter mixture to adjust the thickness of the mixture;

wherein, the thick low fat peanut butter mixture is formed into the low fat peanut butter food slices that are packaged between sheets of inert packaging material, and wherein the low fat peanut butter food slices hold their shape, and each low fat peanut butter food slice can be individually peeled from the inert packaging material without any detrimental sticking thereto that pulls apart the low fat peanut butter food slice.

2. The low fat peanut butter food slice of claim 1 wherein the water mixed with the low-fat peanut powder has a temperature of between 120 degrees to 190 degrees Fahrenheit.

3. The low fat peanut butter food slice of claim 2 wherein the low-fat peanut powder is made from a paste of whole, roasted peanuts from which 60% to 70% of the peanut oil has been removed.

4. The low fat peanut butter food slice of claim 1 wherein the low-fat peanut powder is made from a paste of whole, roasted peanuts from which 60% to 70% of the peanut oil has been removed.

5. A low fat peanut butter food slice made from peanuts ground to create a peanut butter paste with oil that is then pressed to remove peanut oil in the paste and the resultant peanut cake is pulverized to create a free flowing, low fat peanut powder, the low fat peanut butter food slice consisting of only:

low fat peanut powder; and water with honey dissolved therein is mixed with the low fat peanut powder to create a low fat peanut butter mixture having a viscosity greater than 800,000 centipoise and the mixture is thick enough to form the low fat peanut butter food slices;

wherein, no hardening agents or any other materials are added to the water and low fat peanut butter mixture to adjust the thickness of the mixture;

wherein, the low fat peanut powder with the water and honey mixed therein is formed into slices that are packaged between sheets of inert packaging material, and wherein the low fat peanut butter food slices hold their shape, and each low fat peanut butter food slice can be individually peeled from the inert packaging material without any detrimental sticking thereto or pulling apart of the low fat peanut butter food slice.

6. The low fat peanut butter food slice of claim 5 wherein the water and honey mixed with the low fat peanut powder has a temperature of between 120 degrees to 190 degrees Fahrenheit.

7. The low fat peanut butter food slice of claim 6 wherein the low fat peanut powder is made from a paste of whole, roasted peanuts from which 60% to 70% of the peanut oil has been removed.

8. The low fat peanut butter food slice of claim 5 wherein the low fat peanut powder is made from a paste of whole, roasted peanuts from which 60% to 70% of the peanut oil has been removed.

9. The low fat peanut butter food slice of claim 5 wherein the honey is raw honey.

10. The low fat peanut butter food slice of claim 8 wherein the honey is raw honey.

* * * * *